United States Patent [19]

Kirst

[11] Patent Number: 4,591,031
[45] Date of Patent: May 27, 1986

[54] HYDRAULIC SHOCK ABSORBER WITH TWO-WAY ACTION

[75] Inventor: Karl O. R. Kirst, Langenfeld, Fed. Rep. of Germany

[73] Assignee: Ace Controls, Inc., Farmington, Mich.

[21] Appl. No.: 623,418

[22] Filed: Jun. 22, 1984

[30] Foreign Application Priority Data

Jul. 5, 1983 [DE] Fed. Rep. of Germany ....... 3324165

[51] Int. Cl.$^4$ ................................................ F16F 9/48
[52] U.S. Cl. .................................... 188/287; 188/312; 188/317; 267/8 R
[58] Field of Search ............... 188/312, 287, 315, 317, 188/318, 319, 283, 281, 282; 267/8 R

[56] References Cited

U.S. PATENT DOCUMENTS

| | | | |
|---|---|---|---|
| 2,173,574 | 10/1939 | Bindeu et al. | 188/287 |
| 2,814,364 | 11/1957 | Lowe | 188/318 |
| 2,861,795 | 11/1958 | Blake | 267/8 R |
| 2,917,303 | 12/1959 | Vierling | 267/8 R |
| 2,992,815 | 7/1961 | Ellis | 188/312 |
| 3,344,894 | 10/1967 | Kenworthy | 188/287 |
| 3,645,365 | 2/1972 | Domek | 188/287 |
| 4,164,274 | 8/1979 | Schupner | 188/287 |
| 4,298,101 | 11/1981 | Dressell | 188/287 |

FOREIGN PATENT DOCUMENTS

| | | | |
|---|---|---|---|
| 2907101 | 9/1980 | Fed. Rep. of Germany | 188/282 |
| 3245732 | 6/1984 | Fed. Rep. of Germany | . |
| 0841410 | 7/1960 | United Kingdom | 267/8 R |

Primary Examiner—Duane A. Reger
Assistant Examiner—Alvin Oberley
Attorney, Agent, or Firm—Robert G. Mentag

[57] ABSTRACT

The invention relates to a hydraulic shock absorber with two-way action, in which two pistons (18, 19), one for each direction of motion, act in a housing (1). The pistons (18, 19) are movable relative to each other in, or with, a pressure tube (6). Equalizing elements (4, 5) are provided at the ends. The pistons (18, 19) are each provided with a piston rod. The piston rods are provided with seals (38, 39) which are nearly completely relieved of pressure.

8 Claims, 3 Drawing Figures

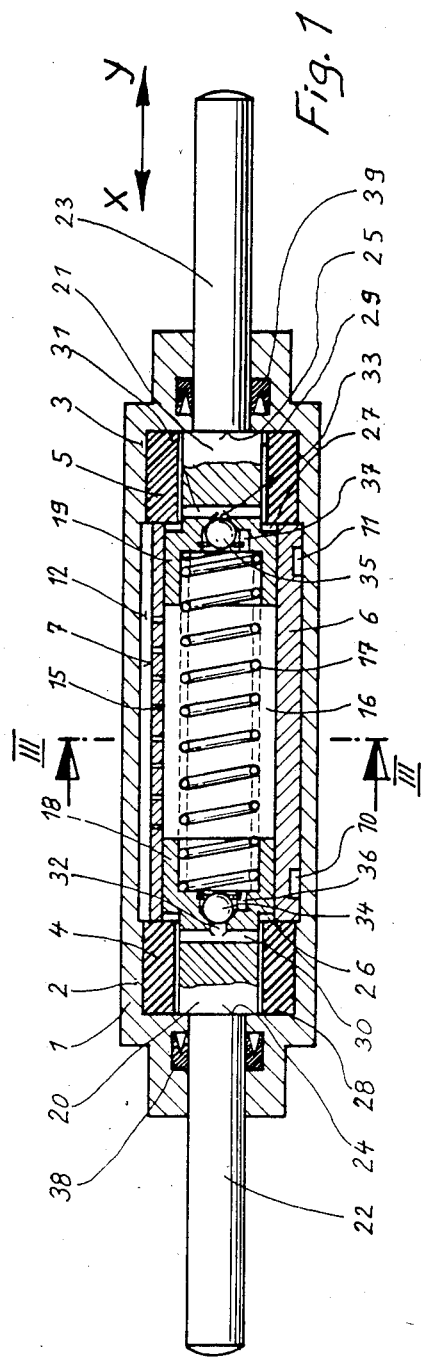
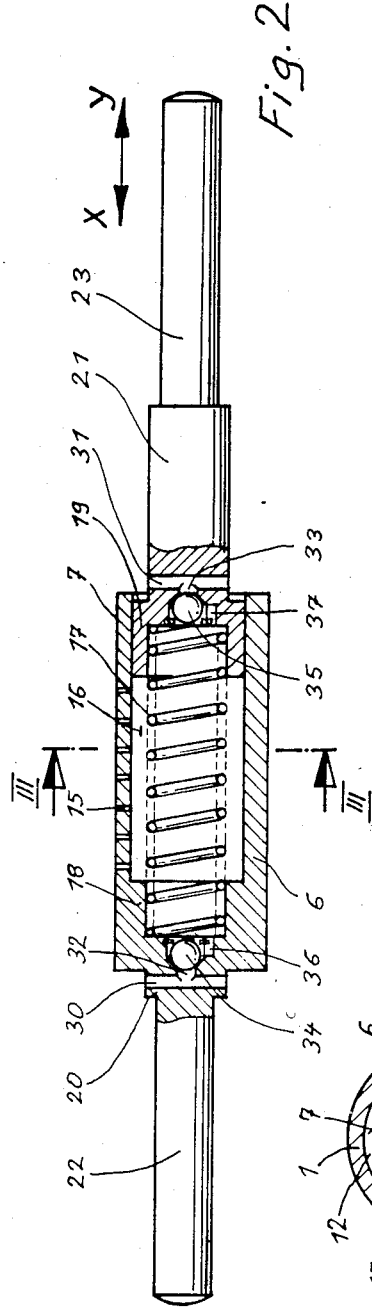
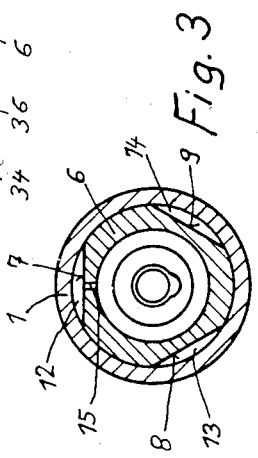

4,591,031

HYDRAULIC SHOCK ABSORBER WITH TWO-WAY ACTION

CROSS REFERENCE TO RELATED FOREIGN APPLICATIONS

The applicant claims the right of priority under 35 U.S.C. 119 of the prior filing date of his corresponding Federal Republic of Germany patent application No. P 33 24 165.1 filed July 5, 1983.

BACKGROUND OF THE INVENTION

1. Technical Field

The invention relates to a hydraulic shock absorber with two-way action, with a pressure tube, completely or partially filled with hydraulic oil, in a housing, and with several throttle openings with fixed or variable settings, which are distributed over the length of the pressure tube and are connected on one hand to a pressure space of the pressure tube and on the other hand to cavities of the housing, with piston rod seals at the ends.

2. Background Information

Shock absorbers are utilized in many technological fields. Easily the largest number of shock absorbers are used for vehicles, where shock absorbers with one-way and with two-way action are both used. The purpose of these shock absorbers is to keep the vehicle as free as possible from vibrations during travel.

In addition to this, shock absorbers are already known on machines and equipment, and have the purpose of braking moving masses over a predetermined path and as free as possible from vibrations. Handling equipment, industrial robots and the like belong to this category.

Since very large takup power has to be accommodated in the minimum space, these shock absorbers are divided into a high pressure part in front of the piston and a lower pressure region outside the pressure tube. The whole piston surface can thereby be usefully used, the seals being easily accessible and pressure-relieved. Of course, these shock absorbers are not suitable for two-way action, so that in order to brake moving masses in both directions practically twice the constructional expenditure must be undertaken, which is often not available in manipulating devices such as handling equipment and industrial robots.

The following listed German, British and U.S. patents were known by the applicant when this application was filed.
DE-OS No. 2,937,242
DE-OS No. 2,932,553
DE-OS No. 2,925,948
DE-OS No. 2,918,644
DE-PS No. 3,224,088
DE-PS No. 3,217,864
DE-PS No. 2,803,514
DE-PS No. 2,322,816
DE-PS No. 2,105,422
DE-PS No. 1,256,485
DE-GM No. 8,234,698.4
DE-GM No. 7,924,834
DE-GM No. 7,913,388.3
German application No. 7,202,036.1 dated: Apr. 20, 1972
U.S. Pat. No. 3,168,168
British Pat. No. 1,100,089

SUMMARY OF THE INVENTION

The object of the invention is to improve a shock absorber with two-way action, of the presupposed type, such that the highest pressures are possible, and in spite of which the seals of the piston rods are completely or practically completely relieved of hydraulic pressure. In addition to this, the whole piston surface is to be effective as a pressure surface.

The invention relates to a hydraulic shock absorber with two-way action, in which two pistons 18, 19, one for each direction of motion, act in a housing 1. These pistons 18, 19 are movable relative to each other in or with a pressure tube 6. Equalizing or takeup elements 4 and 5 are provided at the ends. The pistons 18, 19 are supported on the back side against a hydraulic column by enlargements 20, 21 in the form of piston rods. The piston rod seals 38, 39 are nearly completely relieved of pressure. For example, pressures of 400–1,600 bar can arise in the pressure space 16, while the pressure loading of the piston rod seals 38, 39 is only about 0.5 bar in the case of this example in FIG. 1.

A hydraulic shock absorber with two-way action is proposed by the invention and is particularly suitable for manipulating devices; it not only completely solves the problem on which the invention is based, but in addition offers the advantage of very compact construction. In the hydraulic shock absorber according to the invention, two pistons operate coaxially of each other in a housing with the same pressure tube. The high overpressures in the pressure tube, of e.g. 400–1,200 bar, arising per se in the braking process, cannot act deleteriously on the piston rod seals, since these are practically relieved of the high pressure or medium pressure prevailing in the pressure space or in the housing. Hence there also occur no thermal problems at the piston rod seals, so that these retain their functioning for a long time.

In one embodiment, there is obtained a hydraulic shock absorber which has a particularly small number of individual parts, since the pressure tube and piston can here be connected together integrally, e.g., materially integral.

In another embodiment the piston rods have, respectively in front of the piston, enlargements whose effective surface is acted on by internal pressure and hence can be supported against the internal pressure.

In a particularly advantageous embodiment, at least one respective equalizing or takeup element is arranged at the ends, e.g., between the pressure tube and the housing, to take up the displaced hydraulic oil. Such an equalizing or takeup element can be a closed-cell foam of a suitable material, in particular a plastic which is resistant to the media with which it comes into contact, which has the required degree of flexibility and elasticity, and which also possesses a sufficient degree of recoverability and shape stability. It is also possible to provide, instead of such a foam, a reservoir, e.g. a bubble reservoir, which can be connected at the end of the space or of the spaces into which the hydraulic oil is displaced by the respective piston.

BRIEF DESCRIPTION OF THE DRAWING

The invention is illustrated in the drawing, in part diagrammatically, in two embodiments.

FIG. 1 is a longitudinal section through a hydraulic shock absorber with two-way action;

FIG. 2 is a partial longitudinal section through a further embodiment (without housing).

FIG. 3 is a section view taken along the line III—III of FIG. 1 or of FIG. 2, with housing.

DESCRIPTION OF THE PREFERRED EMBODIMENTS

In the embodiment according to FIG. 1, a housing is given the reference number 1, and—as illustrated in FIG. 3—is also constructed in the embodiment of FIG. 2 as for FIG. 1, i.e., can be elongated in an essentially cartridge shape and cylindrically constructed at its external jacket surface. The housing 1 is otherwise of a tubular shape and has at its end regions respective circular annular projections 2 and 3, extending inwards and having an axial extent; the walls of these circular annular projections 2 and 3 facing the interior of the housing 1 are likewise of cylindrical construction, and thus run parallel to the longitudinal of the housing 1. A respective equalizing or takeup elements 4 or 5 is arranged in this region of the housing 1, lies snugly on the internal cylindrical jacket surface of the respective circular annular projection 2 or 3 and has the same axial length as this circular annular projection 2 or 3. In the embodiments shown, these equalizing or takeup element 4 and 5 consist of an elastic plastic and are respectively constructed as closed-cell foam.

FIGS. 1 and 2 respectively shown the initial position of the shock absorber, in which the shock absorber has not yet been loaded.

A pressure tube 6 extends between the two equalizing or takeup elements 4 and, in the embodiments shown, has three bevels 7, 8, and 9 uniformly distributed over its periphery with their walls running parallel to the long axis of the housing 1, while the remaining wall parts between these bevels 7, 8 and 9 represent the remainder of a common cylindrical envelope surface and thus are enclosed by a common circle.

Furthermore it can be seen from FIG. 1 that a respective connecting groove 10 or 11 is provided in the region of the equalizing or takeoff elements 4 and 5 and connects together, for conduction of pressure medium, the cavities 12, 13 and 14 respectively formed by the bevels 7, 8 and 9 and located in the end region of the pressure tube 6. The bevels 7, 8 and 9 extend over the whole axial length of the pressure tube 6.

In the embodiment according to FIG. 1, the pressure tube 6 is axially arrested by the annular shoulders formed by the circular annular projections 2 and 3. For this purpose, one end of the housing 1 can, for example, be unscrewable, in order to be able to mount the internal parts.

The pressure tube 6 has, at least on one side, several throttle openings running with their long axes mutually parallel and arranged in the axial direction of the pressure tube 6 and mutually spaced apart; only one of these throttle openings is indicated in the figures, with the reference 15. These throttle openings 15 connect a cylindrical pressure space 16 provided within the pressure tube 6 with one of the cavities, e.g., with the cavity 12, and also to the other cavities 13 and 14 via the connecting grooves 10 or 11. The diameter of the throttle openings 15 is made so small that when the hydraulic oil flows through these throttle openings the desired throttling effect occurs. More than one row of such throttle openings 15 can also be provided. For example, it is possible to connect more than one cavity 12 directly to the pressure space 13 by means of such throttle openings 15.

In the embodiment according to FIG. 1, a compression spring 17 is arranged under prestress, coaxial with the pressure tube 6, between two pistons 18 and 19, and tends to push the pistons 18 and 19 apart and move them into the initial position which can be seen in FIG. 1, in which the pistons 18 and 19 abut against a housing surface 24 or 25 with enlargements 20 or 21 of their piston rods 22 or 23. In this position a further axial gap 26 or 27 is present between each of the pistons 18 and 19. A radial gap 28 or 29 is also present, in this initial position, between the enlargements 20 and 21 and the equalizing or takeup elements 4 and 5.

The enlargements 20 and 21 are provided in the region of the pistons 18 and 19 with at least one radial connecting channel 30 or 31, which is respectively connected to the radial gap 28 or 29 for conduction of liquid. A connecting channel 32 or 33 is connected, to conduct liquid, with each of the radial connecting channels 30 or 31. Each of the connecting channels 32 and 33 opens into a valve seat for a check valve, the shutoff body of which is referenced 34 or 35. The closing bodies 34 and 35 open in the direction towards the pressure space 16 and are furthermore constantly loaded in the closing direction by individual spring elements, which are not shown. It can be seen from FIGS. 1 and 2 that the shutoff bodies 34 and 35 are arranged in special valve chambers 36 and 37 respectively.

Piston rods seals are indicated by the reference numbers 38 and 39 (FIG. 1).

The embodiment according to FIG. 2 differs from that according to FIG. 1 in that in it the piston 18 is materially integral with the pressure tube 6. Otherwise, the same reference numbers as in the embodiment according to FIG. 1 have been used for parts having the same function.

The mode of operation of a shock absorber with two-way action according to the invention is as follows:

It is assumed that in FIG. 1 an impulse from a moving mass to be braked acts against the piston rod 23 in the direction X.

The piston 19 then displaced the hydraulic oil which is in front of it in the pressure space 16 of the pressure tube 6 via the throttle openings 15 into the cavity 12, and from there via the connecting grooves 10 and 11 also to the other cavities 13 and 14. The hydraulic oil simultaneously flows out from here to the equaliziang or takeup elements 4 and 5 and compresses these elastically, as a result of which they compensate for the volume of the displaced hydraulic oil. Since the end face of the pressure tube 6 does not closely abut on the equalizing or takeup elements 4 and 5, displaced hydraulic oil also flows respectively behind the pistons 18 and 19.

In the further course of the motion in the direction X, the piston 19 sweeps successively over throttle openings 15, so that the number of the connecting paths from the pressure space 16 to the cavities 12, 13 and 14 and to the equalizing and takeup elements 4 and 5 is progressively reduced.

The hydraulic oil becomes heated by being displaced through the throttle openings 15, so that conversion of energy occurs. In the further course of operation, the moving mass is gradually braked to a standstill.

If the piston 19 is to be moved back into its initial position, this is possible without difficulty, since with a motion in the direction Y the shutoff body 35 opens and allows the amount of hydraulic oil present close behind the piston 19 to flow, against relatively little resistance, into the pressure space 16. The equalizing or takeup elements 4 and 5 then expand again to their initial size according to FIG. 1.

In the embodiment according to FIG. 2, the course of motion is in principle the same as that previously described in connection with FIG. 1, since also in the embodiment according to FIG. 2 the piston 18 can be moved with the pressure tube 6 relative to the piston 19. Also, the arrangement of the rest of the parts, in particular of the housing 1 and the equalizing or takeup elements 4 and 5, is the same as in the embodiment according to FIG. 1.

The features described in the summary, in the description and in the patent claims and also those shown in the drawing are essential, both individually and in any combinations, for the realization of the invention.

I claim:

1. A hydraulic shock absorber with two-way action, with a pressure tube arranged in a housing and at least partially filled with hydraulic oil, and with a plurality of throttle openings which are distributed over the length of the pressure tube and connected on one hand to a pressure space of the pressure tube and on the other hand to cavities (12, 13, 14) radial gaps (28, 19) and axial gaps (26, 27) of the housing, with piston rod seals (38, 39) at the ends, characterized in that:
   (a) a pair of pistons (18, 19), each provided with a solid piston rod, (22, 23) are associated with the common pressure space (16) of the pressure tube (6);
   (b) the piston rod seals (38, 39) are at least nearly completely relieved of the pressure of pressure medium;
   (c) a compression return spring is mounted in said pressure space, between said pistons, and the ends thereof are seated against the respective adjacent piston;
   (d) each of said pistons has a channel means extended therethrough for connecting the respective adjacent radial cap at its end of the pressure tube with the pressure space (16) in the pressure tube; and;
   (e) each of the pistons has a check valve mounted in the channel means therein for normally closing off flow of hydraulic oil through said channel means during a shock absorbing movement of a piston inward of the pressure tube, and for allowing flow of hydraulic oil through said channel means from said cavities and gaps and back to said pressure space in the pressure tube during a retroactive outward movement of a piston in the pressure tube.

2. A hydraulic shock absorber according to claim 1, characterized in that:
   (a) one of the pistons (18) is integrally connected to the pressure tube (6) and is axially movable in common with this, to a limited extent, relative to the other piston (19).

3. A hydraulic shock absorber according to claims 1 or 2, characterized in that:
   (a) the piston rods (22, 23) respectively have enlargements (20, 21) in front of the piston (18, 19), which act as supports against the internal pressure in the pressure tube (6).

4. A hydraulic shock absorber according to claims 1 or 2, characterized in that:
   (a) the throttle openings are disposed in fixed settings.

5. A hydraulic shock absorber according to claims 1 or 2, characterized in that:
   (a) the throttle openings are disposed in variable settings.

6. A hydraulic shock absorber according to claim 3, characterized in that:
   (a) at least one respective equalizing element (4, 5) is arranged in the region of the enlargements (20, 21) to compensate for at least a part of the volume of hydraulic oil which is displaced in the braking process.

7. A hydraulic shock absorber according to claim 6, characterized in that:
   (a) each equalizing element (4, 5) is constructed as a closed-cell, elastic foam.

8. A hydraulic shock absorber according to claim 6, characterized in that:
   (a) each equalizing element (4, 5) is constructed as a bubble reservoir, to receive at least a part of the hydraulic oil which is displaced in the braking process.

* * * * *